UNITED STATES PATENT OFFICE 2,042,220

CATALYTIC OXIDATION OF UNSATURATED ALCOHOLS

Herbert P. A. Groll, Oakland, and Henry W. de Jong, Berkeley, Calif., assignors to Shell Development Company, San Francisco, Calif., a corporation of Delaware No Drawing. Application April 18, 1934, Serial No. 721,156

28 Claims. (Cl. 260—138)

This invention relates to the catalytic oxidation of unsaturated primary and secondary alcohols to unsaturated carbonyl compounds and is more particularly concerned with reacting an unsaturated alcohol, other than a tertiary carbinol, with oxygen in the presence of an oxidizing catalyst at elevated temperatures.

Our process comprises effecting the oxidation of an unsaturated alcohol, other than a tertiary carbinol, by causing it to react with oxygen, which oxygen may be present as oxygen per se or in admixture with other gaseous materials as nitrogen, carbon dioxide, etc. containing, for example, from 21.0% to 99.9% oxygen, or the oxygen may be liberated or formed under the conditions of operation from substances containing oxygen in combined form.

$$CH_2=C-CH_2OH, CH_2=C-CH_2OH, CH_2=C-CH_2OH, CH_2=C-CH_2OH$$
$$\quad\;\; |\qquad\qquad\quad |\qquad\qquad\quad |\qquad\qquad\quad |$$
$$\quad\;\; CH_3\qquad\qquad C_2H_5\qquad\qquad C_3H_7\qquad\qquad C_4H_9$$

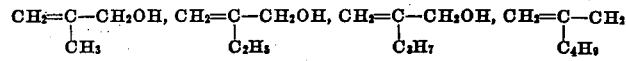

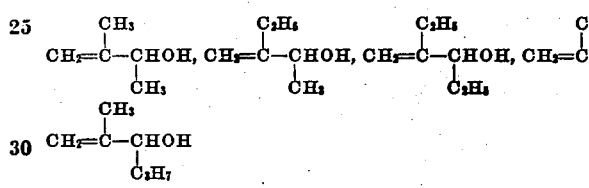

We are particularly concerned with effecting the oxidation of unsaturated alcohols containing the grouping

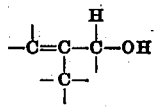

wherein the loose bonds may be taken up by hydrogen, alkyl, alkoxy, carbocyclic, heterocyclic, aralkyl and/or aralkoxy groups which may or may not be further substituted. Another particularly adaptable group of unsaturated alcohols comprises the grouping

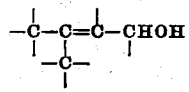

wherein the tertiary unsaturated carbon atom is not adjacent to the carbon atom to which the carbinol group is attached. The general formula for the compounds comprising the above groupings may be represented by

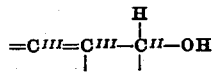

wherein at least one of the carbon atoms designated by $C^{III}$ is of tertiary character and wherein the carbon atom represented by $C^{II}$ may be either of primary or secondary character.

The unsaturated alcohols suitable for utilization in accordance with the principles embodied in our invention may be regarded as homologues of allyl alcohol such as and the like or may be represented by their isomers

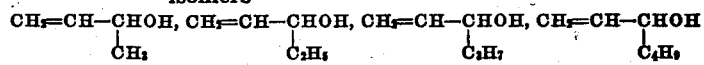

and the like, or may comprise the compounds

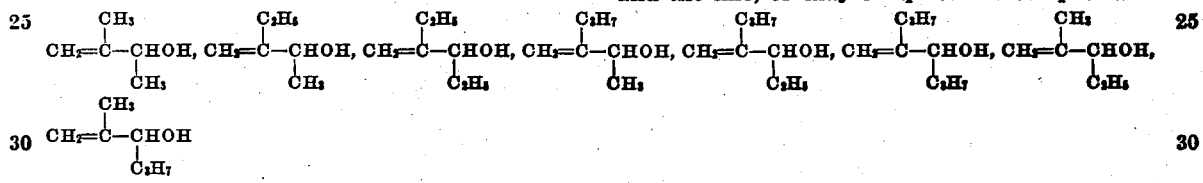

and the like. Other contemplated unsaturated alcohols have the character

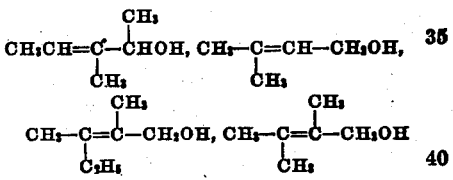

etc., and their homologues. Instead of the alkyl derivatives, the aryl and aralkyl derivatives may be resorted to, in which cases, the cyclic nuclei may be heterocyclic as well as carbocyclic.

Other suitable unsaturated alcohols include furfuryl alcohol, allylene type alcohols such as propargyl alcohol and polyhydric unsaturated compounds such as

and their homologues, analogues and substitution products.

We are aware of the fact that the simplest isolated unsaturated alcohol, namely allyl alcohol, has been oxidized to acrolein by the passage of a mixture of allyl alcohol vapor and air over silver and/or gold catalysts at temperatures of about 200 to 350° C. and over a glowing platinum spiral at temperatures of about 750° C. The yields of acrolein obtainable in accordance with the disclosed conditions of operation, have been too low to merit technical consideration of a process for producing acrolein or to merit application of the disclosed principles for the economical production of unsaturated carbonyl compounds by oxidation of higher homologues of allyl alcohol.

We have found that if allyl alcohol, preferably in the vapor phase, is caused to react with oxygen in the presence of an oxidizing catalyst, preferably copper or alloys thereof, at temperatures of from 360° C. to 550° C., undesirable side reactions are repressed and excellent yields of acrolein are obtained.

It is to be understood that the term "oxidation" as used throughout this specification and the accompanying claims is intended to exclude the type of reaction known as dehydrogenation. A dehydrogenation comprises splitting hydrogen atoms from a hydrogen containing compound whereby molecular hydrogen is obtained as a reaction product. In an oxidation process, as herein defined, the unsaturated alcohol reacts with oxygen whereby water and an unsaturated carbonyl compound are obtained. In the majority of cases, the unsaturated alcohols are oxidized to the corresponding unsaturated carbonyl compounds. With some species of unsaturated alcohols, unsaturated carbonyl compounds containing fewer carbon atoms than the unsaturated alcohol reacted may be obtained. The present invention may be considered as an alternative process and as an improvement on the process of copending application No. 670,029 filed by H. P. A. Groll, May 8, 1933 wherein the dehydrogenation of unsaturated alcohols of primary or secondary character is claimed. We have found that when oxidation is resorted to, the tendency to yield saturated carbonyl compounds by hydrogenation is avoided and in addition the activity and life of the catalyst is influenced to a much lesser extent by polymerization of the resulting products.

Our invention is executed in a preferred temperature range of from 300° C. to 550° C. with unsaturated alcohols containing at least four carbon atoms to the molecule. The use of temperatures below 300° C. is in the majority of cases impractical due to the relatively slow rate of reaction even when exceedingly low space velocities are employed. The practical upper limit of the reaction temperature is set by the occurrence of pyrolytic side reactions at too high a temperature at the existing pressure. The temperature chosen for each specific operation is dependent on the stability and character of the unsaturated alcohol reacted and also on the stability of the resulting product as regards cracking, polymerization and resistance against further oxidation. If there is present an unsaturated tertiary carbon atom contiguous to a carbinol group in the molecule of the unsaturated alcohol undergoing oxidation, higher temperatures can be resorted to since these alcohols and their corresponding carbonyl compounds are more stable than the straight chain or other olefinic alcohols. When it is desired to employ high space velocities it may be of advantage to operate at temperatures near the upper limit of the allowable range. If low space velocities are employed, it may be desirable to operate at temperatures near the lower limit of the range.

The term "space velocity" may be defined as the unit volume of unsaturated alcohol flowing through the apparatus per unit volume of catalyst, under standard conditions of temperature and pressure.

The catalyst employed in the execution of our process may be an element, alloy or compound of a metal or metalloid capable of acting as an oxidizing catalyst when employed in accordance with the principles embodied in our invention. The following are mentioned as examples of suitable catalysts and they may comprise among others; copper, silver, gold, platinum, cobalt, nickel, vanadium, aluminum, chromium, tin, tungsten, zinc, copper oxide, cobalt oxide, nickel monoxide, nickelic oxide, chromium oxide, brass, gold-silver alloy, vanadyl sulphate, silver vanadate, palladium, cadmium, zinc oxide, stannous oxide, manganous oxide, silver-zinc and silver-arsenic alloys, zinc sulphide, etc. Oxidizing catalysts containing a metal of the third period of the Periodic table such as Ti, V, Cr, Mn, Fe, Co, Ni, Cu, Zn, As, and Se were found to be particularly suitable catalysts for effecting the oxidation of unsaturated primary and secondary alcohols at elevated temperatures. The particular catalyst selected can be prepared in an active form in a variety of ways well known to the art. For example, active metal catalysts may be prepared by the reduction of oxides, hydroxides, or carbonates of metal with hydrogen at a suitable temperature. While it may be desirable in certain cases to apply catalyst carriers offering large porous surfaces which may increase the catalytic activity of the catalyst, the highly exothermic nature of the reaction often forbids the use of catalysts or carriers of low heat conductivity. In the majority of cases, we prefer to use catalysts which are of a compact metallic nature, such as metal wire screen, turnings, granules, nails and the like. The metallic surfaces may be activated by a variety of methods. For example, copper may be activated by successive oxidation and reduction.

We have found activated copper and activated silver metals to be particularly suitable catalysts. These catalysts are relatively inexpensive, are easily prepared and reactivated and are not readily susceptible to poisoning due to traces of halogen and sulphur compounds that may be present in one of the reactants. Their catalytic activity, which is normally decreased with use, may be restored by amalgamating the surface and supplying heat to drive off the combined mercury, thus leaving an activated catalytic metal surface.

It is seen that the most desirable catalyst, in any case, is one which possesses a moderate initial activity and is substantially devoid of the tendency to induce undesirable side reactions as dehydration, condensation, polymerization and the like; and possesses a freedom from deterioration as a result of sintering or poisoning.

The operation is, in the majoritiy of cases, conducted in the vapor phase. When the vapor phase method is employed, the alcohol vapor in admixture with an excess of oxygen per se or oxygen contained in a mixture or solution with other gases as in air is passed preferably continuously over the stationary catalyst at a predetermined space velocity. The exit vapors may be passed into a fractionating column wherein the more volatile carbonyl compound is separated and the less volatile unreacted alcohol reutilized. The water formed as a by-product of the oxidation reaction may be separated from the unsaturated carbonyl compounds and/or unreacted alcohol by any suitable method as fractionation, stratification, use of drying agents, etc. In many instances, the reutilized or originally applied unsaturated alcohol need not be free of water. Our invention provides an intermittent, batch or continuous mode of operation whereby unsaturated alcohols may be substantially converted to unsaturated carbonyl compounds.

Our process may in general be executed at pressures slightly in excess of atmospheric, although it can be seen that when operating with certain unsaturated alcohols which might themselves decompose, polymerize or yield readily polymerizable or decomposable products at the desired reaction temperature, it may be desirable to employ atmospheric or subatmospheric pressures.

The principal reaction is exothermic. The temperature of the catalytic mass may be kept substantially constant at the predetermined desired temperature by any one or combinations of the suitable methods known to the art. By a proper method of distributing the gas mixture comprising unsaturated alcohol and oxygen throughout the catalyst bed, the whole may be kept at a uniform temperature without application of external heat, thus effecting a considerable economy of operation. Furthermore, the space velocity may be adjusted and the heat of reaction thereby controlled, or suitable heat exchangers may be internally or externally applied. The reaction zone may be surrounded by a selected constant boiling substance which on vaporization consumes heat liberated by the exothermic reaction and thereby maintains a substantially constant temperature of the reaction zone. This constant boiling substance, if inert, may be directly introduced into the reaction zone, recovered and reused. If desired, the exothermic oxidation reaction may be conducted in conjunction with an endothermic reaction such as a dehydrogenation in such a manner that the heat liberated by the former is supplied to the latter, thus effecting thermal economies.

For illustrative purposes only, reference is had to several examples which typify preferred methods of executing our invention.

Example I

A mixture of 2-methyl-propene-1-ol-3

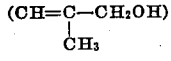

vapor and air was passed over 75 c. c. activated copper catalyst contained in a pyrex reaction tube and maintained at a temperature of about 400° C. throughout the operation.

The catalyst was prepared by the reduction of #17 copper oxide wire in an atmosphere of hydrogen at about 300° C.

The rate of feed was about 120 c. c. of 2-methyl-propene-1-ol-3 (calculated as liquid) and 3 cu. ft. of air per hour. During the operation a total of 105.2 gms. of 2-methyl-propene-1-ol-3 was passed over the catalyst.

The reaction product was fractionated. A total of 62.2% of the unsaturated alcohol was oxidized to 2-methyl-propene-1-al-3

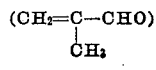

Example II

The same apparatus and catalyst as described in Example I were utilized. 2-methyl-butene-1-ol-4

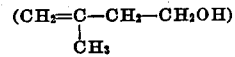

vapor in admixture with air was passed over 75 c. c. of the activated copper catalyst heated to a temperature of about 300° C. The rate of feed was about 120 c. c. of 2-methyl-butene-1-ol-4 (calculated as liquid) and 2.5 cu. ft. of air per hour.

The reaction product on fractionation showed a 70.2% conversion of the unsaturated alcohol to the unsaturated aldehyde having the probable formula

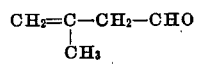

The product boiled at about 116° C. to 118° C., while the unreacted alcohol boiled at 138° C. to 140° C. The recovered unreacted alcohol was reutilized by passage over the same catalyst.

Example III

Silver wire screen was amalgamated by dipping it in mercury and allowing it to stand for about 36 hours. Then the amalgamated silver screen was packed into a stainless steel reaction tube having a catalyst space of 200 c. c. and slowly heated to about 600° C. while a stream of air was passed through the tube. When all the mercury had been driven off, the temperature was lowered to about 450° C. and maintained substantially constant at that temperature throughout the operation.

2-methyl-propene-1-ol-3

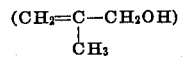

was passed in admixture with air over the heated catalyst. The average rate of feed was about 900 c. c. of 2-methyl-propene-1-ol-3 (calculated as liquid) and 23 cu. ft. of air per hour.

62% of the unsaturated alcohol was oxidized to 2-methyl-propene-1-al-3 in one passage over the catalyst.

Example IV

The same apparatus and an activated copper catalyst, prepared as described in Example I, were utilized.

Allyl alcohol ($CH_2=CH-CH_2OH$) vapor and air were passed over the catalyst maintained at a temperature of about 375° C. The rate of feed was about 120 c. c. of allyl alcohol (calculated as liquid) and about 3.75 cu. ft. of air per hour.

The conversion of allyl alcohol to acrolein ($CH_2=CH-CHO$) was about 78% in one passage over the catalyst.

Example V

A copper gauze catalyst was packed in a reaction tube which had a catalyst space of about 150 c. c.

2-methyl-butene-1-ol-3

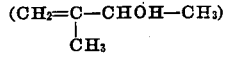

vapor in admixture with air was passed over the catalyst heated to and maintained at about 350° C.

The average rate of feed was about 240 c. c. of 2-methyl-butene-1-ol-3 (calculated as liquid) and 5 cu. ft. of air per hour.

The reaction product was fractionated at atmospheric pressure. The unreacted unsaturated alcohol boiling at 117° C. was separated from the 2-methyl-butene-1-one-3

$$(CH_2=C-CO-CH_3)$$
$$\phantom{(CH_2=C}\overset{|}{CH_3}$$

which boils at about 97° C. A conversion of about 72% was effected in one passage over the catalyst. The recovered alcohol was reutilized by passage with air over the same catalyst and substantially the same percentage conversion to the corresponding unsaturated ketone was effected.

*Example VI*

Vanadyl sulphate $((VO)_2(SO_4)_3)$ supported on silica gel was packed in a tube having a catalyst space of about 75 c. c.

The catalyst was maintained at a temperature of about 410° C. while the vapor of 2-methyl-3-phenyl-propene-1-ol-3

$$\left(CH_2=\overset{|}{\underset{CH_3}{C}}-CHOH-\bigcirc\right)$$

in admixture with air was passed through the tube at an average rate of 120 c. c. of unsaturated alcohol (calculated as liquid) and about 2.5 cu. ft. of air per hour.

The reaction product was distilled and the unsaturated ketone 2-methyl-3-phenyl-propene-1-one-3

$$\left(CH_2=\overset{|}{\underset{CH_3}{C}}-CO-\bigcirc\right)$$

boiling at about 200° C. was separated from the unreacted alcohol boiling at 222-224° C. The conversion in one passage through the tube was about 65%.

*Example VII*

A nickel gauze catalyst was packed into a reaction tube having a catalyst space of about 150 c. c.

The catalyst was maintained at an average temperature of 450° C., while a mixture of cinnamyl alcohol $$\left(\bigcirc-CH=CH-CH_2OH\right)$$

vapor and oxygen was passed through the tube. The rate of feed of the reactants was about 240 c. c. of cinnamyl alcohol (calculated as liquid) and 1 cu. ft. of oxygen per hour.

A conversion of about 85% of the cinnamyl alcohol to cinnamic aldehyde $$\left(\bigcirc-CH=CH-CHO\right)$$

was effected in one passage over the catalyst.

*Example VIII*

A mixture of 2-methyl-propene-1-ol-3

$$(CH_2=C-CH_2OH)$$
$$\phantom{(CH_2=C}\overset{|}{CH_3}$$

vapor and air was passed over 180 c. c. of activated copper catalyst in a KA2 steel reaction tube maintained at a temperature of 300° C. The catalyst was the same as that used in Example I.

The rate of feed was about 300 c. c. of 2-methyl-propene-1-ol-3 (calculated as liquid) and 6.5 cu. ft. of air per hour. During the operation, a total of 1621 gm. of 2-methyl-propene-1-ol-3 was passed over the catalyst. 56.7% of the unsaturated alcohol was oxidized to 2-methyl-propene-1-al-3 in one passage over the catalyst.

The unsaturated aldehyde recovered by fractionation was of high purity.

It will be evident to those skilled in the art that the specific operating conditions such as space velocities, pressures, etc. may be varied within wide limits within the scope of our invention, depending on the specific reaction catalyzed, the catalyst employed and the product desired.

The products obtained in the practice of our invention may be utilized per se in the production of resins or they may be condensed with any of the well known agents such as aldehydes, ketones, phenols, amines, ethers, etc. The products obtained may also be used for the purpose of introducing alkenyl groups into organic compounds by condensation or by the use of organo metallo derivatives. The unsaturated carbonyl compounds can also be oxidized to the corresponding acids and have varied uses in pharmaceutical chemistry.

While we have in the foregoing described in some detail the preferred embodiments of our invention and some variants thereof, it will be understood that this is only for the purpose of making the invention more clear and that the invention is not to be regarded as limited to the details of operation described, nor is it dependent on the soundness or accuracy of the reasons advanced for the advantageous results attained. On the other hand, the invention is to be regarded as limited only by the terms of the accompanying claims, in which it is our intention to claim all novelty inherent therein as broadly as possible in view of the prior art.

We claim as our invention:

1. A process for the oxidation of an unsaturated aliphatic alcohol, other than a tertiary carbinol, to an unsaturated carbonyl compound which comprises reacting said unsaturated aliphatic alcohol with oxygen in the presence of an oxidizing catalyst at a temperature between 360° C. and 550° C.

2. A process for the oxidation of an unsaturated aliphatic alcohol, other than a tertiary carbinol, and containing at least four carbon atoms to the molecule, to an unsaturated carbonyl compound which comprises reacting said unsaturated aliphatic alcohol with oxygen in the presence of an oxidizing catalyst at a temperature between 300° C. and 550° C.

3. A process for the oxidation of an unsaturated aliphatic alcohol, other than a tertiary carbinol, and containing only one olefinic linkage, to an unsaturated carbonyl compound which comprises reacting said unsaturated aliphatic alcohol with oxygen in the presence of an oxidizing catalyst containing a metal of the third period of the Periodic table at a temperature at which the oxidation to an unsaturated carbonyl compound occurs at a practical rate while side reactions are substantially obviated.

4. A process for the oxidation of an unsaturated aliphatic alcohol, other than a tertiary carbinol, to an unsaturated carbonyl compound which comprises reacting said unsaturated aliphatic alcohol with oxygen in the presence of an oxidizing catalyst containing a metal of the third period of the Periodic table at a temperature greater than 200° C. but below that at which substantial decomposition occurs.

5. A process for the oxidation of an unsaturated aliphatic alcohol, other than a tertiary carbinol, to an unsaturated carbonyl compound which comprises reacting said unsaturated aliphatic alcohol with oxygen in the presence of an oxidizing catalyst containing copper at a temperature greater than 200° C. but below that at which substantial decomposition occurs.

6. A process for the oxidation of an unsaturated aliphatic alcohol, other than a tertiary carbinol, and containing only one olefinic linkage, to an unsaturated carbonyl compound which comprises reacting said unsaturated aliphatic alcohol with oxygen in the presence of an oxidizing catalyst containing copper at a temperature at which the oxidation to an unsaturated carbonyl compound occurs at a practical rate while side reactions are substantially obviated.

7. A process for the oxidation of an unsaturated secondary aliphatic alcohol containing at least four carbon atoms to an unsaturated carbonyl compound which comprises reacting said unsaturated aliphatic alcohol in the vapor phase with oxygen in the presence of an oxidizing catalyst at a temperature at which the oxidation to an unsaturated carbonyl compound occurs at a practical rate while side reactions are substantially obviated.

8. A process for the oxidation of an unsaturated secondary aliphatic alcohol containing at least four carbon atoms to an unsaturated carbonyl compound which comprises reacting said unsaturated aliphatic alcohol with oxygen in the presence of an oxidizing catalyst at a temperature above 200° C. but below that at which substantial decomposition occurs.

9. A process for the oxidation of an unsaturated aliphatic alcohol containing the grouping

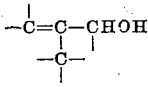

to an unsaturated carbonyl compound which comprises reacting said unsaturated aliphatic alcohol with oxygen in the presence of an oxidizing catalyst at a temperature at which the oxidation to an unsaturated carbonyl compound occurs at a practical rate while side reactions are substantially obviated.

10. A process for the oxidation of an unsaturated aliphatic alcohol containing the grouping

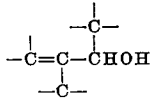

to an unsaturated carbonyl compound which comprises reacting said unsaturated aliphatic alcohol with oxygen in the presence of an oxidizing catalyst at a temperature at which the oxidation to an unsaturated carbonyl compound occurs at a practical rate while side reactions are substantially obviated.

11. A process for the oxidation of an unsaturated aliphatic alcohol, other than a tertiary carbinol, and containing only one unsaturated tertiary carbon atom, to an unsaturated carbonyl compound which comprises reacting said unsaturated aliphatic alcohol with oxygen in the presence of an oxidizing catalyst at a temperature at which the oxidation to an unsaturated carbonyl compound occurs at a practical rate while side reactions are substantially obviated.

12. A process for the oxidation of allyl alcohol to acrolein which comprises reacting allyl alcohol with oxygen in the presence of an oxidizing catalyst containing a metal of the third period of the Periodic table at a temperature at which the oxidation to an unsaturated carbonyl compound occurs at a practical rate while side reactions are substantially obviated.

13. A process for the oxidation of allyl alcohol to acrolein which comprises reacting allyl alcohol with oxygen in the presence of an oxidizing catalyst containing copper at a temperature at which the oxidation to an unsaturated carbonyl compound occurs at a practical rate while side reactions are substantially obviated.

14. A process for the oxidation of allyl alcohol to acrolein which comprises reacting allyl alcohol with oxygen in the presence of an oxidizing catalyst at temperatures between 360° C. and 550° C.

15. A process for the oxidation of 2-methyl-propene-1-ol-3 to 2-methyl-propene-1-al-3 which comprises reacting 2-methyl-propene-1-ol-3 with oxygen in the presence of an oxidizing catalyst at a temperature at which the oxidation to an unsaturated carbonyl compound occurs at a practical rate while side reactions are substantially obviated.

16. A process for the oxidation of 2-methyl-butene-1-ol-3 to 2-methyl-butene-1-one-3 which comprises reacting 2-methyl-butene-1-ol-3 with oxygen in the presence of an oxidizing catalyst at a temperature at which the oxidation to an unsaturated carbonyl compound occurs at a practical rate while side reactions are substantially obviated.

17. A process for the oxidation of an unsaturated aliphatic alcohol, other than a tertiary carbinol, to an unsaturated carbonyl compound which comprises reacting said unsaturated aliphatic alcohol with oxygen in the presence of an oxidizing catalyst essentially comprising silver metal at a temperature at which the oxidation to an unsaturated carbonyl compound occurs at a practical rate while side reactions are substantially obviated.

18. A process for the oxidation of an unsaturated aliphatic alcohol, other than a tertiary carbinol, to an unsaturated carbonyl compound which comprises reacting said unsaturated aliphatic alcohol with oxygen in the presence of a silver metal catalyst at a temperature greater than about 300° C. but below the temperature at which substantial decomposition occurs.

19. A process for the oxidation of an unsaturated aliphatic alcohol, other than a tertiary carbinol, which comprises reacting an unsaturated aliphatic alcohol containing an olefine linkage between two aliphatic carbon atoms at least one of which is linked to a carbon atom which in turn is linked to a hydroxy group and at least one hydrogen atom with oxygen at a temperature at which oxidation to an unsaturated carbonyl compound occurs at a practical rate while side reactions are substantially obviated.

20. A process for the catalytic oxidation of an unsaturated aliphatic alcohol of the general formula

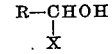

wherein R represents an alkyl radical containing an olefinic linkage between two aliphatic carbon atoms one of which is linked to the carbinol group, and X represents hydrogen or an alkyl radical, which comprises reacting said unsaturated aliphatic alcohol with oxygen in the presence of a silver metal catalyst at a temperature greater than about 300° C. but below the temperature at which substantial decomposition occurs.

21. A process for the catalytic oxidation of an unsaturated aliphatic alcohol of the general formula

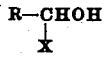

wherein R represents an alkyl radical containing an olefinic linkage between two aliphatic carbon atoms one of which is tertiary and one of which is linked to the carbinol group, and X represents hydrogen or an alkyl radical, which comprises reacting such an unsaturated aliphatic alcohol with oxygen in the presence of a silver metal catalyst at a temperature at which the oxidation to an unsaturated carbonyl compound occurs at a practical rate while side reactions are substantially obviated.

22. A process for the catalytic oxidation of an unsaturated aliphatic alcohol of the general formula R—CH2OH, wherein R represents an organic radical containing an olefinic linkage between two aliphatic carbon atoms one of which is linked to the carbinol group, which comprises reacting such an unsaturated aliphatic alcohol with oxygen in the presence of a catalyst comprising silver metal at a temperature greater than about 300° C. but below the temperature at which substantial decomposition occurs.

23. A process for the catalytic oxidation of an unsaturated aliphatic alcohol of the general formula

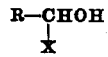

wherein R represents an organic radical containing an olefinic linkage between two aliphatic carbon atoms and linked to the carbinol group by a carbon atom, and X represents hydrogen or an alkyl radical, which comprises reacting such an unsaturated aliphatic alcohol with oxygen in the presence of a relatively inert diluent and an oxidizing catalyst at a temperature greater than about 300° C. but below the temperature at which substantial decomposition occurs.

24. A process for the catalytic oxidation of an unsaturated aliphatic alcohol of the general formula

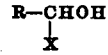

wherein R represents an alkyl radical containing an olefinic linkage between two aliphatic carbon atoms and linked to the carbinol group by a carbon atom and X represents hydrogen or an alkyl radical, which comprises reacting such an unsaturated aliphatic alcohol with air in the presence of an oxidizing catalyst at a temperature at which reaction occurs at a practical rate while side reactions are substantially obviated.

25. A process for the catalytic oxidation of an unsaturated aliphatic alcohol of the general formula

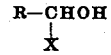

wherein R represents an alkyl radical containing an olefinic linkage between two aliphatic carbon atoms one of which is linked to the carbinol group and X represents hydrogen or an alkyl radical, which comprises reacting such an unsaturated aliphatic alcohol with air in the presence of a catalyst essentially comprising silver metal at a temperature greater than about 300° C. but below the temperature at which substantial decomposition occurs.

26. A process for the oxidation of isobutenol to methyl acrolein which comprises reacting isobutenol with oxygen in the presence of a catalyst essentially comprising silver metal at a temperature at which the oxidation occurs at a practical rate while decomposition reactions are substantially obviated.

27. A process for the oxidation of isobutenol to methyl acrolein which comprises reacting isobutenol with oxygen, said reacting being effected in the vapor phase in the presence of a silver metal catalyst at a temperature greater than about 300° C. but below the temperature at which substantial decomposition occurs.

28. A process for the oxidation of isobutenol to methyl acrolein which comprises reacting isobutenol with air in the presence of a silver metal catalyst at a temperature of about 550° C.

HERBERT P. A. GROLL.
HENRY W. DE JONG.